(12) United States Patent
Ford (10) Patent No.: US 8,417,124 B2
(45) Date of Patent: Apr. 9, 2013

(54) MULTIPLE INPUT, MULTIPLE OUTPUT (MIMO) COMMUNICATION VIA MULTIMODE MEDIA

(75) Inventor: James Arthur Ford, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 1085 days.

(21) Appl. No.: 12/265,590

(22) Filed: Nov. 5, 2008

(65) Prior Publication Data

US 2010/0111525 A1 May 6, 2010

(51) Int. Cl.
*H04B 10/12* (2006.01)
(52) U.S. Cl.
USPC .......................................... 398/143; 398/43
(58) Field of Classification Search .................... 398/143
See application file for complete search history.

(56) References Cited

U.S. PATENT DOCUMENTS

| | | | | |
|---|---|---|---|---|
| 4,149,072 A * | 4/1979 | Smith et al. | ........ | 398/139 |
| 4,627,062 A * | 12/1986 | Bender | ........ | 372/36 |
| 4,710,642 A * | 12/1987 | McNeil | ........ | 250/559.04 |
| 6,314,115 B1 * | 11/2001 | Delfyett et al. | ........ | 372/6 |
| 7,081,808 B2 * | 7/2006 | Colombo et al. | ........ | 398/166 |
| 7,978,981 B2 * | 7/2011 | Buckman et al. | ........ | 398/131 |
| 2002/0114034 A1 * | 8/2002 | Way | ........ | 359/124 |
| 2003/0020985 A1 * | 1/2003 | LaGasse et al. | ........ | 359/135 |
| 2006/0050754 A1 * | 3/2006 | Morris et al. | ........ | 372/50.12 |
| 2007/0264028 A1 * | 11/2007 | Yuki et al. | ........ | 398/183 |
| 2008/0070502 A1 * | 3/2008 | George et al. | ........ | 455/41.2 |

OTHER PUBLICATIONS

Rick C. J. Hsu et al., "Capacity Enhancement in Coherent Optical MIMO (COMIMO) Multimode Fiber Links," IEEE Communcations Letters, vol. 10, No. 3, pp. 195-197.*
Rick C. J. Hsu et al., "Capacity Enhancement in Coherent Optical MIMO (COMIMO) Multimode Fiber Links," IEEE Communcations Letters, vol. 10, No. 3, pp. 195-197, Mar. 2006.*
Patel et al., "Spatially Resolved Detection and Equalization of Modal Dispersion Limited Multimode Fiber Links", Journal of Lightwave Technology, IEEE, vol. 24, No. 7, Jul. 2006, pp. 2629-2636.
Chen et al., "MIMO Equalization and Cancellation for 10GBASE-T", ICASSP 2006, IEEE, IV, pp. 637-640.
Amar et al., "Limits on the Resolution of Closely Spaced Multipath Signals", Proceedings of the 5th International Symposium on Image and Signal Processing and Analysis 2007 (Proc. ISPA07), pp. 230-233.

(Continued)

*Primary Examiner* — Xinning Niu
(74) *Attorney, Agent, or Firm* — Sterne, Kessler, Goldstein & Fox PLLC (57) ABSTRACT

Multiple input, multiple output (MIMO) communication systems and a method using multimode media are provided. A MIMO communication system includes an array of emitters that receives a data signal and outputs a plurality of signals (e.g., modulated light, or other signal types) representative of the data signal, a multimode medium (e.g., a multimode fiber, a fiber bundle, a bundle of cables) that receives the plurality of signals from the array of emitters and carries the plurality of signals in a plurality of modes, and an array of detectors that receives the plurality of signals carried by the multimode medium and outputs the data signal. The system can include a demultiplexer that demultiplexes a single high-speed data stream into the array of emitters as the data signal. The system can also include a multiplexer that multiplexes the data signal from the array of detectors back into the single high-speed data stream.

34 Claims, 8 Drawing Sheets

OTHER PUBLICATIONS

Alon et al., "Equalization of Modal Dispersion in Multimode Fiber using Spatial Light Modulators", IEEE Communication Society, Globecom 2004, pp. 1023-1029.

Greenberg et al., "Data Parallelization by Optical MIMO Transmission over Multi-Mode Fiber with Inter-modal Coupling", IEEE 2006, pp. 641-642.

* cited by examiner

MULTIPLE INPUT, MULTIPLE OUTPUT (MIMO) COMMUNICATION VIA MULTIMODE MEDIA

BACKGROUND OF THE INVENTION

1. Field of the Invention

The present invention relates generally to communications between transceiver devices.

2. Background Art

The use of fiber optics has been commonly known in the telecommunication industry for decades. More recently, fiber optics has been integrated into cable television networks, and it is also now used in many local area networks linking computer systems in universities, office complexes, commercial or industrial plants, etc.

Communication using fiber optics entails sending a signal in the form of light from one end of a transparent fiber (made of glass or plastic, for example) to the other end of the fiber. A light source can include a light emitting diode (LED) or a laser, for example, that provides a signal converted into light pulses. A fiber optic cable that houses the fiber guides the light pulses from the light source to a receiver at the other end. Repeaters can be used in the cable to prevent loss of strength. The receiver can then convert the light pulses back into the original signal.

There are two main types of fiber used for fiber optics: single mode fiber (SMF) and multimode fiber (MMF). A single mode fiber is very narrow in diameter (approximately 8-10 µm), and its small core allows only one mode to propagate (i.e., one path of light). This prevents distortion and provides little signal attenuation. It also provides a higher transmission rate, covers more distance, and carries higher bandwidth than multimode fiber. However, using single mode fiber costs more and can require a light source with a narrow spectral width.

Multimode fiber has a larger diameter than a single mode fiber (approximately 5-100 µm), and can provide high bandwidth at high speed over short distances. Multimode fiber is rated by its bandwidth per unit length, with categories ranging from OM1 (62.5 (core diameter)/125 µm (cladding diameter)) to OM2 (50/125 µm) to OM3 (laser optimized 50/125 µm) to OM3+ (extended reach), based on standard ISO 11801. In a multimode fiber, light waves travel in numerous paths, or modes, through the fiber. It is typically used for short range, low data rate applications because the spread in delays of signals propagating on the various modes causes dispersion or pulse broadening, leading to limited bandwidth. Over long distances, signal distortion due to the multiple modes can result in data transmission errors. However, use of multimode fiber generally costs less than use of single mode fiber.

Therefore, systems and methods are needed that take advantage of the low cost of using MMF in communication systems while avoiding the issues with MMF described above.

BRIEF SUMMARY

Multiple input, multiple output (MIMO) communication systems and a method using multimode media are provided. According to embodiments, a MIMO communication system includes an array of emitters that receives a data signal and outputs a plurality of signals (e.g., modulated light, or other signal types) representative of the data signal, a multimode medium (e.g., a multimode fiber, a fiber bundle, a bundle of cables, free space, etc.) that receives the plurality of signals from the array of emitters and carries the plurality of signals in a plurality of modes, and an array of detectors that receives the plurality of signals carried by the multimode medium and outputs the data signal. In an embodiment, the system can include a demultiplexer that receives and demultiplexes a single high-speed data stream into the array of emitters as the data signal.

The system can also include a multiplexer that receives and multiplexes the data signal from the array of detectors back into the single high-speed data stream.

According to an embodiment, a method of multiple input, multiple output (MIMO) communication via a multimode medium between a transmitting device and a receiving device includes demultiplexing, at the transmitting device, a single high-speed data stream into a demultiplexed data signal. The demultiplexed data signal is converted, at the transmitting device, into a plurality of signals (e.g., modulated light, or other signal types) representative of the demultiplexed data signal. The plurality of signals is provided via a multimode medium (e.g., a multimode fiber, a fiber bundle, a bundle of cables, free space, etc.) from the transmitting device to the receiving device in a plurality of modes. The plurality of signals is converted, at the receiving device, back into the demultiplexed data signal. The demultiplexed data signal is multiplexed, at the receiving device, back into the single high-speed data stream.

Embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

Embodiments of the present invention will be described with reference to the accompanying drawings, wherein generally like reference numbers indicate identical or functionally similar elements. Also, generally, the leftmost digit(s) of the reference numbers identify the drawings in which the associated elements are first introduced.

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

The present invention is directed to multiple input, multiple output (MIMO) communication systems and a method using multimode media. The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Introduction/Overview

An objective of this invention is to take advantage of the low cost of using MMF in communication systems while avoiding the issues associated with MMF. In wireless communication systems, such as wireless local area networks (WLANs), higher data rates and longer ranges have been achieved using multiple input, multiple output (MIMO) systems over single input single output (SISO) systems. In such a system, multiple transmitters and receivers (and multiple antennas) are used, creating multiple data paths. In a MIMO system, multiple sets of received data are collected and processed to recover an original signal. The multiple sets of data, though ideally identical, are likely to be subsets of the original set due to transmission errors. The multiple subsets can be analyzed and processed, however, to recover the original data set. These principles of a MIMO system can be applied to fiber optic communication systems with the use of MMF, and can also be applied to communication systems that use other types of signal-carrying media, in order to obtain greater speed, bandwidth, and coverage area for lower cost.

Exemplary Signal Flow

Figure 1:
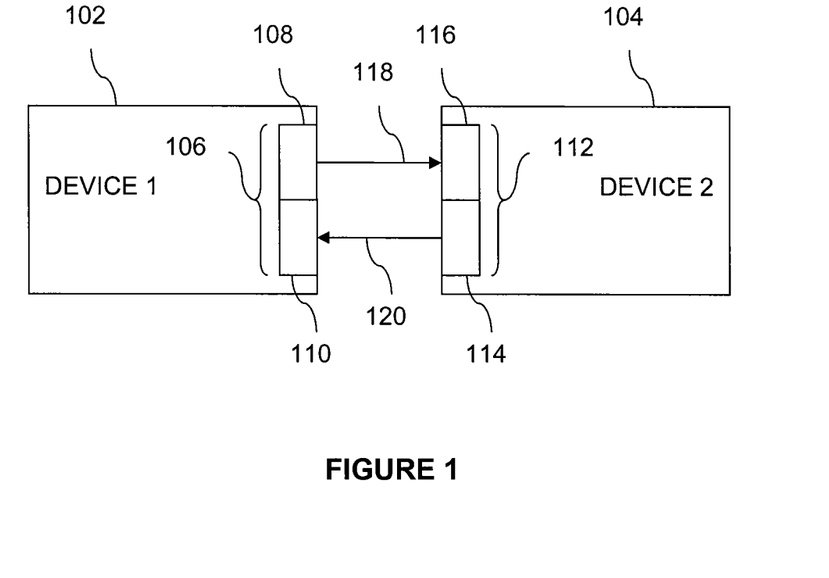
FIG. 1 illustrates an exemplary flow of a signal from a transmitting device to a receiving device.

FIG. 1 illustrates an exemplary flow of a signal from a transmitting device to a receiving device. In FIG. 1, a first device 102 and a second device 104 are shown. First device 102 and second device 104 can be servers or other computing or electronic devices capable of transmitting and/or receiving a signal, including, but not limited to, commercial servers, personal computers, cable television devices, telecommunications devices, etc. First device 102 includes one or more transceivers 106, which includes a transmitter 108 and a receiver 110. Second device 104 includes one or more transceivers 112, which includes a transmitter 114 and a receiver 116. Data signal 118 is communicated from transmitter 108 of the first device 102 to receiver 116 of second device 104. Similarly, data signal 120 is communicated from transmitter 114 of second device 104 to receiver 110 of first device 102. Data signal 118 and data signal 120 can be carried over various types of media, such as, for example, coaxial cables, twisted pairs, fiber optic cables, wirelessly, etc. For purposes of this document, this description will focus on one-way communication from a transmitting device to a receiving device for simplification of discussion. One skilled in the art will realize that communication in the other direction would occur in a similar manner.

Figure 2:
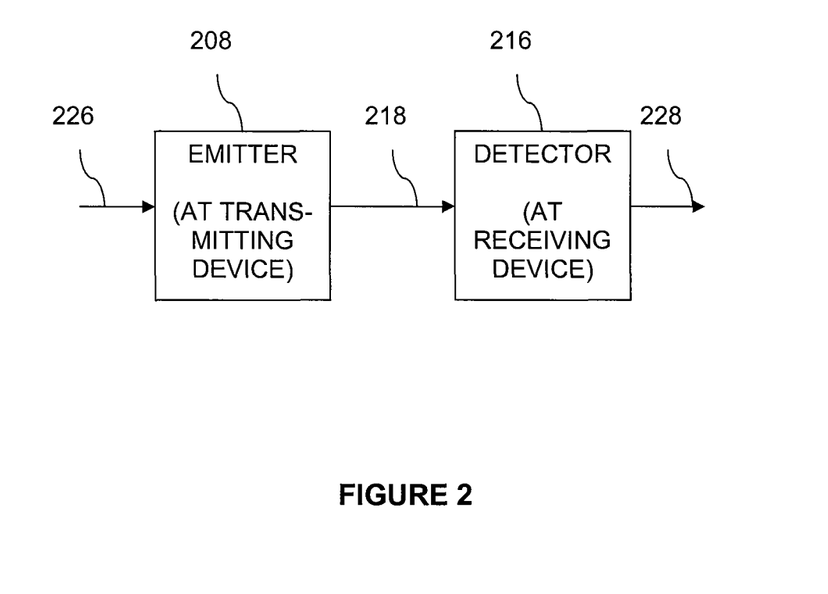
FIG. 2 illustrates an exemplary flow of a signal from an emitter to a detector.

FIG. 2 illustrates an exemplary flow of a signal from an emitter 208 at a transmitting device to a detector 216 at a receiving device. Emitter 208 can be considered equivalent to transmitter 108 (or 114), or can be considered a part of transmitter 108 (or 114). Similarly, detector 216 can be considered equivalent to receiver 116 (or 110) or can be considered a part of receiver 116 (or 110). Emitter 208 receives a signal 226 and emits signal 226 as signal 218 for detection at detector 216. Detector 216 outputs signal 218 as signal 228. Signal 218 can be carried over various types of media as discussed above with reference to data signals 118 and 120. Signals 226, 218, and 228 can be identical signals. However, signals 226, 218, and 228 may be of differing formats. For example, one or more of signals 226, 218, and 228 may be an electrical signal, a wireless signal (e.g., RF signal, Bluetooth signal, etc.), or a light wave. The various media used to carry signals 226, 218, and 228 depend on which format is used for each signal, or vice versa.

MIMO Systems Using Multimode Media

Figure 3:
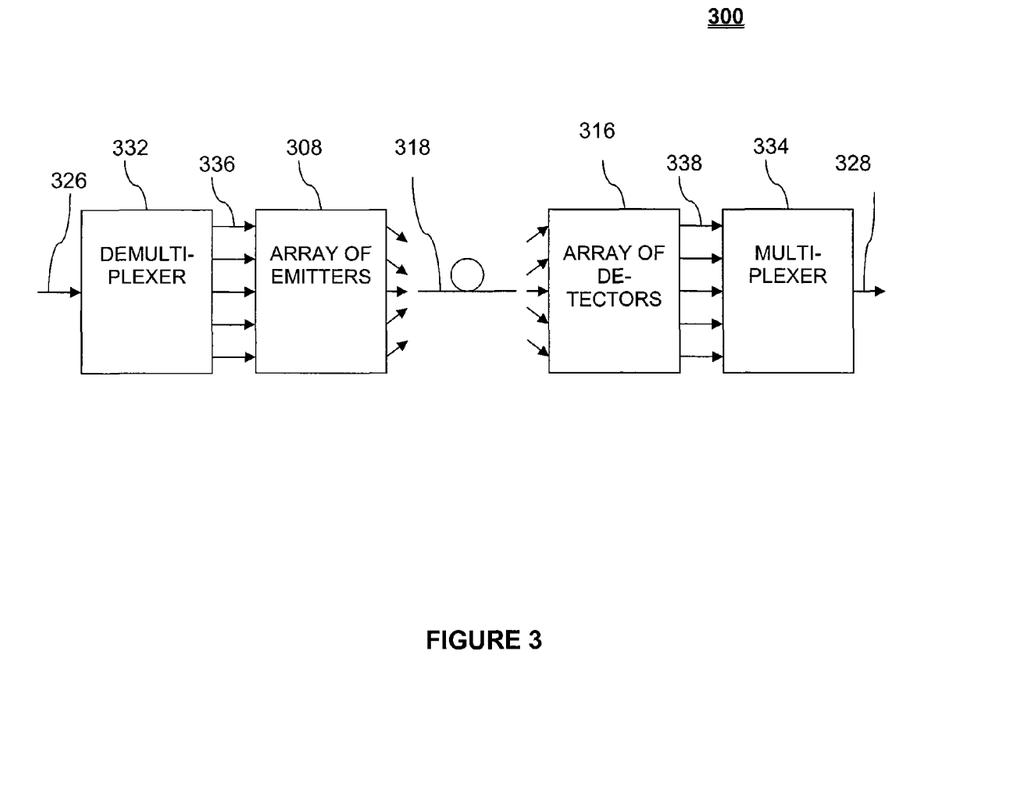
FIG. 3 illustrates a multiple input, multiple output (MIMO) communications system over a multimode medium, according to an embodiment of the present invention.

FIG. 3 illustrates a multiple input, multiple output (MIMO) communications system 300 using a multimode medium, according to an embodiment of the present invention. System 300 includes a demultiplexer 332, an array of emitters 308, an array of detectors 316, and a multiplexer 334. The array of emitters 308 includes two or more emitters similar to emitter 208 in FIG. 2. Similarly, the array of detectors 316 includes two or more detectors similar to detector 216 in FIG. 2. The array of emitters 308 and the array of detectors 316 are connected via a multimode medium 318. Multimode medium 318 can include, but is not to be limited to, a multimode fiber (or fiber optic cable encasing a multimode fiber), a bundle of fibers, a bundle of coaxial cables, a bundle of twisted pairs, or other types of media capable of carrying a signal, including free space.

In system 300, an original signal 326 (e.g., a single high-speed data stream) is demultiplexed by demultiplexer 332 into a demultiplexed signal 336, which includes a plurality of signals (e.g., a plurality of identical signals). The demultiplexed signal 336 is provided to the array of emitters 308. The array of emitters sends forth, or emits, the demultiplexed signal 336 into multimode medium 318. Multimode medium 318 carries the demultiplexed signal 336 over multiple paths, or modes, to the array of detectors 316. The array of detectors 316 provides the demultiplexed signal 336 (as signal 338) to multiplexer 334, which outputs the original signal 326 as received signal 328. In this system, original signal 326 is sent over multiple paths from a transmitting device that includes the array of emitters 308 to a receiving device that includes the array of detectors 316. At the receiving device, the signals of each path are processed together to correct any transmission errors that may have occurred, and the original signal 326 is then output for use (shown as signal 328) by the receiving device. The signal processing can occur at the array of detectors 316, at the multiplexer 334, or it can be handled by another device capable of signal processing (not shown).

As stated above, the multimode medium 318 can include various types of media capable of carrying a signal. One such medium is multimode fiber (MMF). When multimode fiber is used as multimode medium 318 in system 300, demultiplexed signal 336 is converted to light waves (e.g., modulated light) prior to being emitted by the array of emitters 308. This conversion can be handled by the array of emitters 308 or by another device capable of converting a signal to a light wave (not shown). The array of emitters 308 (e.g., an array of launch lasers) shines the modulated light into the MMF of multimode medium 318. When this occurs, each emitter excites a different mode in the MMF. In this way, demultiplexed signal 336 is carried by multimode medium 318 in a plurality of modes in the form of modulated light. The array of detectors 316 (e.g., an array of photo diodes) detects the modulated light, with each detector detecting a different mode. The modulated light is converted back into signals representative of demultiplexed signal 336 and provided (as signal 338) to multiplexer 334, which outputs the original signal 326 as received signal 328. As previously described, any transmission errors that may have occurred in any of the signal modes can be corrected by processing the signals of each mode together. This signal processing can occur at the array of detectors 316, at the multiplexer 334, or it can be handled by another device capable of signal processing (not shown).

The number of emitters in an array of emitters 308 and the number of detectors in an array of detectors 316 can vary. Where a WLAN communication system typically does not exceed three transmitters and three receivers, an array of emitters and an array of detectors used with MMF in embodiments of this invention can each have up to ten or more emitters and detectors, respectively, subject to limitations of size, weight, power, and cost.

Figure 4A:
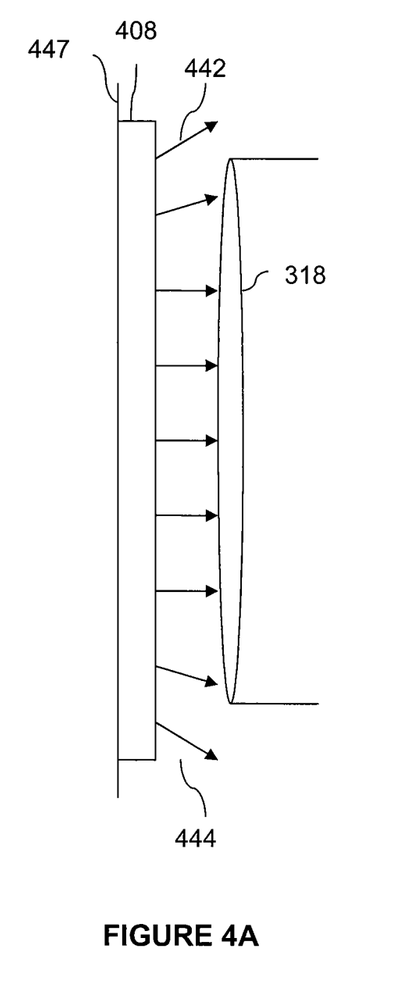
FIGS. 4A and 4B illustrate using a planar surface for placement of an array of emitters or detectors, according to an embodiment of the present invention.
Figure 4B:
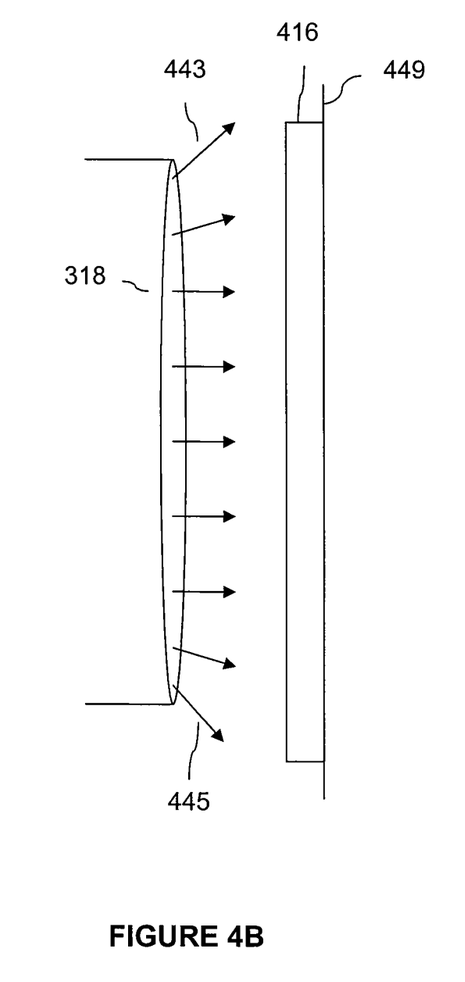
Figure 5A:
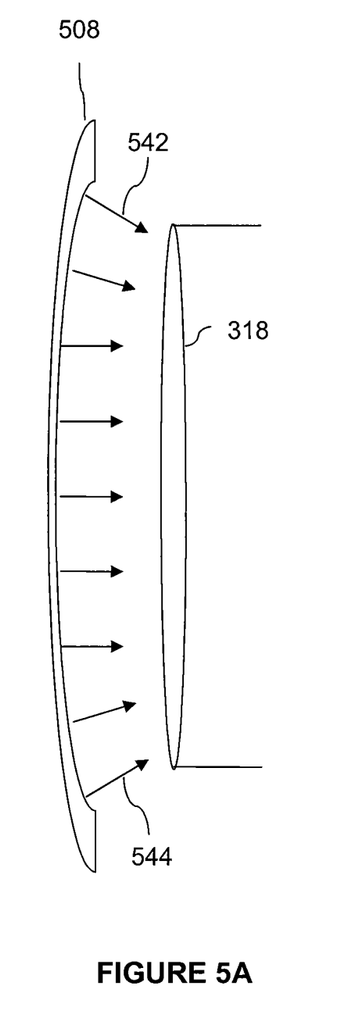
FIGS. 5A and 5B illustrate using a concave surface for placement of an array of emitters or detectors, according to an embodiment of the present invention.
Figure 5B:
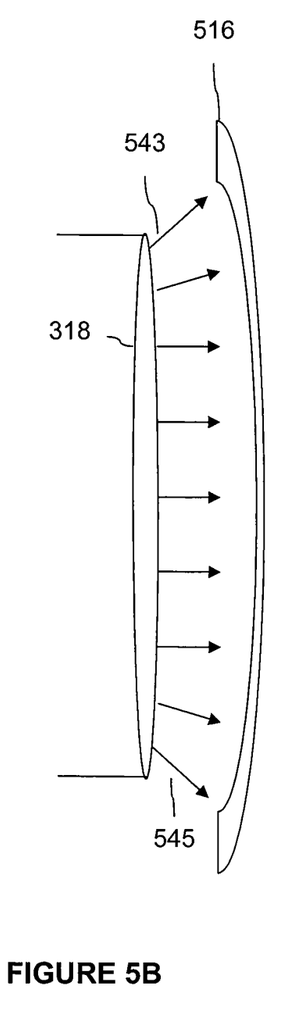

In an embodiment, the array of emitters 308 and the array of detectors 316 can be placed on a semiconductor wafer. Using a planar semiconductor wafer in a system that uses MMF, however, can lead to loss of light at the edge of the wafer. An example of this is shown in FIG. 4A, where an array of emitters 408 is arranged on a planar surface 447. Light beams 442 and 444 will not enter multimode medium 318 and will be lost. Similarly, in FIG. 4B, an array of detectors 416 is arranged on a planar surface 449. Light beams 443 and 445 will not be detected and will be lost. This should not present a problem because only a small portion of the light will be lost due to paths (or modes) that do not reach a detector, and the light modes that are not lost should be able to sufficiently protect against transmission errors. However, to prevent loss of light, the arrays of emitters and detectors can be located on a concave surface as shown in FIGS. 5A and 5B. In FIG. 5A, light beams 542 and 544 from array of emitters 508 are shown able to enter multimode medium 318. Similarly, in FIG. 5B, light beams 543 and 545 are shown able to reach the array of detectors 516. When placed on a concave surface, the emitters can all shine the same amount of light into the MMF, and the detectors can all receive the same amount of light from the MMF. These embodiments include use of a planar or a concave surface, however other surface shapes can successfully be used within the scope of the invention.

Figure 6:
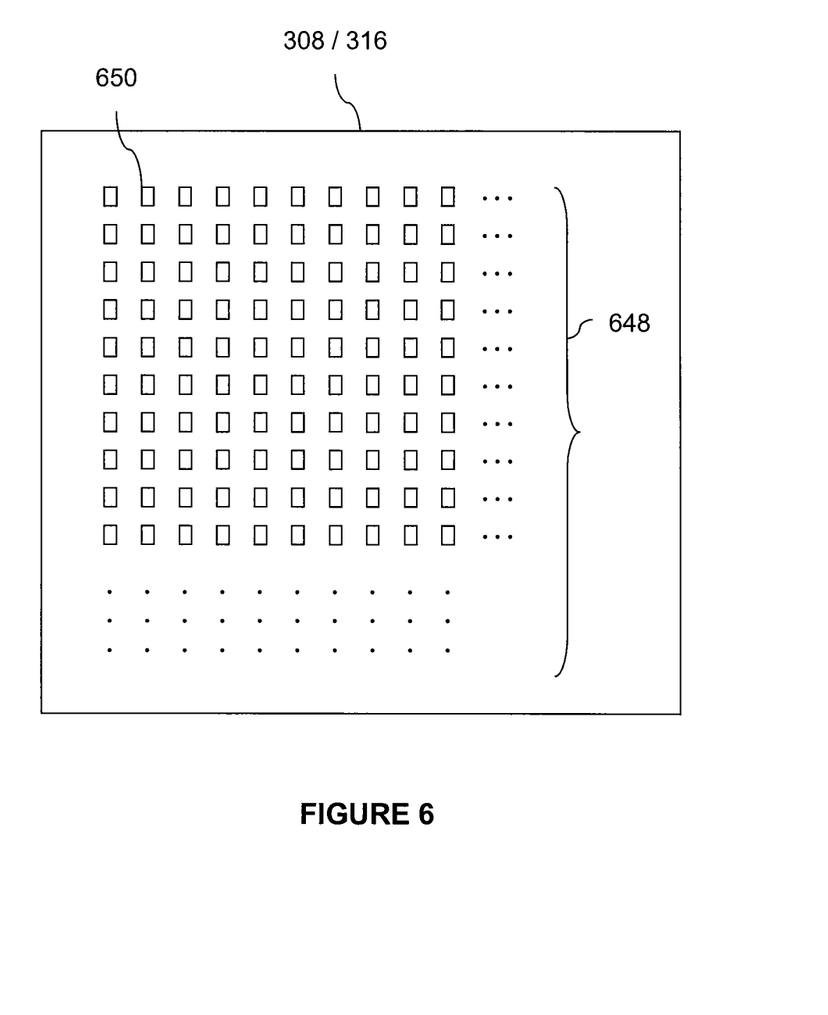
FIG. 6 depicts an array of emitters or detectors in a square pattern, according to an embodiment of the present invention.
Figure 7:
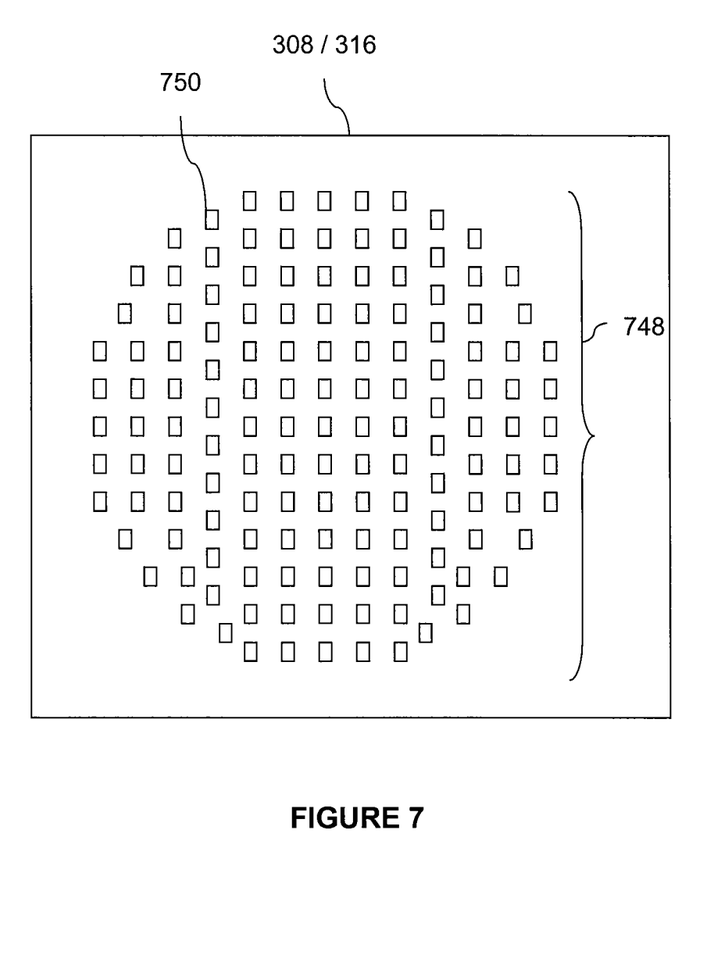
FIG. 7 depicts an array of emitters or detectors in a circular pattern, according to an embodiment of the present invention.

Examples of array of emitters 308 (or array of detectors 316) are shown in FIGS. 6 and 7, according to embodiments of the present invention. In FIGS. 6 and 7, each box 650/750 represents an emitter (or detector). The array shown in FIG. 6 is arranged in a square pattern 648. The array shown in FIG. 7 is arranged in a circular pattern 748. Arrangements of emitters (or detectors) are not to be limited to square and circular shapes, as other pattern shapes can also be used within the scope of the invention. In fact, there may be economic or performance reasons for using different patterns of emitter/detector population to better match up with the distribution of modes. For example, there may be "dark spots" associated with certain areas on a wafer which can never be reached.

As stated previously, the multimode medium 318 can include various media capable of carrying a signal. For example, in one embodiment, it can include a single MMF. In another embodiment, it can include a bundle of fibers. Using a bundle of fibers may be more favorable for MIMO electronics to encode and decode, since using a bundle of fibers can lead to more statistically independent paths. In other embodiments, the multimode medium 318 can include a bundle of coaxial cables or twisted pairs. In such embodiments, the cross-talk among the cables can provide a set of multiple paths for each signal.

The above-described invention involves modal dispersion, which is the difference in propagation speed of the different modes, to provide a multipath environment in which to improve bandwidth. In an embodiment of the present invention, chromatic dispersion can also improve bandwidth. Chromatic dispersion involves the difference in propagation speed of different wavelengths. This is the dominant form of dispersion in single mode fiber (SMF). In this embodiment, multiple emitters emit different wavelengths of light into the fiber, and multiple detectors detect different wavelengths of light coming out of the fiber. When using SMF, the lowest loss in fiber occurs in the 1.55 μm telecommunications window (a loss of approximately 0.2 db per km), where chromatic dispersion is much higher than in the 1.31 μm window (a loss of approximately 0.5 db per km). Therefore, the lowest loss and the highest bandwidth would coincide. In a further embodiment, MIMO using modal dispersion and multiwavelength MIMO using chromatic dispersion could also be combined for even greater bandwidth gains.

The MIMO communication system using multimode media as described above is designed to maximize bandwidth and to minimize bit error rate of a channel with an almost arbitrary spatial transfer function. This transfer function will change over time, as the excited modes are arbitrary, uncontrolled, and may vary as environmental conditions of the transmitter, multimode media, and receiver vary. Therefore, there is a need for channel state information at both ends of a link. Because target applications are likely to need bidirectional data flow, this is not a burdensome constraint. In an embodiment, with multimode media running in each direction, channel state information can be exchanged between transceivers over lower order modes (for stability) and at a low bit rate so as to minimize the effect on overall bandwidth. In a further embodiment, this channel state information can also be made available to devices using the link to exchange data for maintenance and other purposes.

Exemplary Method

Figure 8:
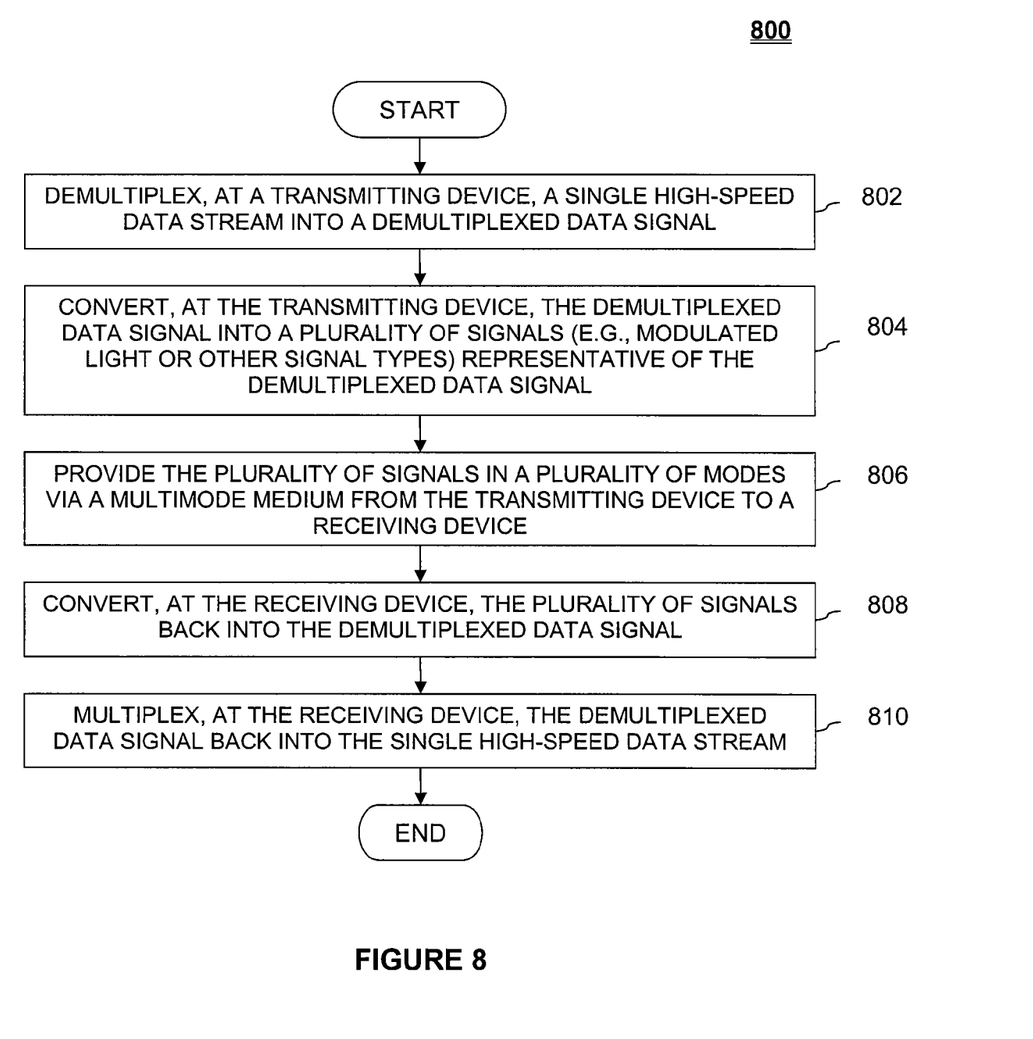
FIG. 8 is a flowchart depicting a method of multiple input, multiple output (MIMO) communication via a multimode medium between a transmitting device and a receiving device, according to an embodiment of the present invention.

FIG. 8 is a flowchart depicting a method 800 of multiple input, multiple output (MIMO) communication between a transmitting device and a receiving device, according to an embodiment of the present invention. In step 802 of method 800, a single high-speed data stream is demultiplexed at a transmitting device into a demultiplexed data signal. For example, the single high-speed data stream can be demultiplexed into a plurality of signals identical to the single high speed data stream. In step 804, the demultiplexed data signal is converted, at the transmitting device, into a plurality of signals (e.g., modulated light, or other signal types) representative of the demultiplexed data signal. In step 806, the plurality of signals is provided in a plurality of modes (or paths) via a multimode medium from the transmitting device to a receiving device. In step 808, the plurality of signals is converted back into the demultiplexed data signal at the receiving device. The signals of the demultiplexed data signal can be processed to correct any transmission errors that may have occurred along any of the paths. In step 810, the demultiplexed data signal is multiplexed, at the receiving device, back into the single high-speed data stream for use by the receiving device. Method 800 then ends.

FURTHER EMBODIMENTS, USES, FEATURES, AND ADVANTAGES

Multiple input, multiple output (MIMO) communication systems and a method using multimode media are provided herein. System 300, method 800, and variants thereof, can be used to maximize bandwidth and minimize bit error rate, achieving a higher data rate and lower power consumption and cost over a SISO communication system. System 300 and method 800 can be applied for use in the telecommunications industry, the cable industry, and local area networks, for example. It can be used for communications between transmitting and receiving devices located within or between office buildings and offices, university buildings and offices, industrial plant buildings and offices, homes, etc.

In addition to those already discussed elsewhere in this document, there are numerous advantages of the present invention, in particular with the use of MIMO over MMF. For example, MIMO over MMF has an advantage over SISO over SMF in that MIMO over MMF requires lower speed electronics for similar bandwidth and length, leading to lower power consumption and cost. Further, production and coupling tolerances are much more relaxed for MMF, also resulting in lower cost. In the MIMO over MMF embodiments, coupling tolerances are likely to be even further relaxed versus SISO over SMF because of the multiple emitters and detectors and the adaptive nature of the system. In applications where MMF is already employed, inserting MIMO optoelectronics can upgrade the bandwidth of the existing plant.

A MIMO advantage over SISO is that of greater speed. Further, with the MIMO approach, coupling of the light from the emitters into the fiber and the light from the fiber into the detectors is less critical, leading to lower manufacturing costs and less sensitivity to vibration and temperature variations. Because multiple emitters and detectors are used, and the exact distribution of optical modes excited is not critical, wafers with non-functional devices can be used, leading to higher, if not 100% yields and lower costs. In addition, the power consumed and dissipated as heat is spread over multiple emitters, leading to decreased cooling requirements and further reduction in cost. (Detectors do not dissipate substantial heat.)

An advantage of MIMO versus use of mode strippers, in which light in the higher order modes is forced into the cladding around the fiber core (by bending the fiber around a mandrel) leaving a single mode, is that MIMO takes advantage of the higher order modes rather than removing them, resulting in lower loss in the fiber. In addition, mode stripping is known to be unreliable, whereas MIMO has adaptation built into it for reliability, as would be understood by one skilled in the relevant art.

As discussed above, multimode fiber is rated by its bandwidth per unit length, with categories ranging from OM1 to OM2 to OM3 to OM3+. Bandwidth per kilometer, as well as price, increase from OM1 to OM3+. MIMO over MMF is able to increase the bandwidth of even the inexpensive OM1 fiber. In fact, just as MIMO WLAN systems require a rich multipath environment to operate properly, it is likely that MIMO over MMF will work best on the most modally dispersive and least expensive fiber, OM1.

Compared to using a WLAN radio channel, MIMO over MMF can have hundreds of propagating modes to use, and its emitters and detectors would be microscopically fabricated on a semiconductor wafer rather than macroscopically assembled onto a printed circuit board or connected into a chassis, as is the case for WLAN antenna environments. MIMO over MMF also has the advantage over WLAN environments in that the multipath channel using emitters and detectors naturally lends itself to two-dimensional arrays for larger diversity gains. As stated previously, while WLAN systems typically do not exceed three transmitters and three receivers, an array of emitters and an array of detectors used for MIMO over MMF can each have up to ten or more emitters and detectors, respectively, subject to limitations of size, weight, power, and cost.

As will be appreciated by persons skilled in the relevant art(s), the system(s) and method(s) described here represent only a few possible embodiments of the present invention. Many of the elements described herein could, in alternative embodiments of the present invention, be configured differently within the scope and spirit of the present invention. In addition, additional elements, or a different organization of the various elements, could still implement the overall effect and intent of the present systems and method. Therefore, the scope of the present invention is not limited by the above disclosure and detailed embodiments described therein, but rather is determined by the scope of the appended claims.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof.

The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A multiple input, multiple output (MIMO) communication system comprising:
    an array of emitters that receives a data signal and outputs a plurality of signals that are substantially replicas of one another and that are each representative of the data signal;
    a multimode medium, coupled to the array of emitters, that receives the plurality of signals from the array of emitters and carries the plurality of signals in a plurality of modes; and
    an array of detectors, coupled to the multimode medium, that receives the plurality of signals carried by the multimode medium and outputs the data signal.

2. The MIMO communication system of claim 1, further comprising:
    a demultiplexer, coupled to the array of emitters, that receives and demultiplexes a single high-speed data stream into the array of emitters as the data signal; and
    a multiplexer, coupled to the array of detectors, that receives and multiplexes the data signal from the array of detectors back into the single high-speed data stream.

3. The MIMO communication system of claim 1, wherein the multimode medium is a multimode fiber.

4. The MIMO communication system of claim 3, wherein the plurality of signals output from the array of emitters is modulated light.

5. The MIMO communication system of claim 3, wherein at least one of the array of emitters and the array of detectors is arranged in a planar manner.

6. The MIMO communication system of claim 3, wherein at least one of the array of emitters and the array of detectors is arranged to minimize loss of light when spaced apart from the multimode medium.

7. The MIMO communication system of claim 6, wherein both the array of emitters and the array of detectors are arranged in a concave manner.

8. The MIMO communication system of claim 3, wherein at least one of the array of emitters and the array of detectors is arranged in a square pattern.

9. The MIMO communication system of claim 3, wherein at least one of the array of emitters and the array of detectors is arranged in a circular pattern.

10. The MIMO communication system of claim 3, wherein at least one of the array of emitters and the array of detectors is arranged in a pattern that optimizes distribution of the plurality of modes.

11. The MIMO communication system of claim 3, wherein the multimode fiber is rated as one of OM1, OM2, OM3, and OM3+ as classified by an ISO 11801 standard.

12. The MIMO communication system of claim 3, wherein modal dispersion is used to improve bandwidth.

13. The MIMO communication system of claim 3, wherein chromatic dispersion is used to improve bandwidth.

14. The MIMO communication system of claim 3, wherein modal dispersion and chromatic dispersion are used to improve bandwidth.

15. The MIMO communication system of claim 1, wherein the multimode medium is a fiber bundle.

16. The MIMO communication system of claim 1, wherein the multimode medium is a bundle of coaxial cables.

17. The MIMO communication system of claim 1, wherein the multimode medium is a bundle of twisted pairs.

18. The MIMO communication system of claim 1, wherein the multimode medium is used to communicate channel state information between a transmitting device of which the array of emitters is a part and a receiving device of which the array of detectors is a part.

19. The MIMO communication system of claim 18, wherein the channel state information is communicated over lower order modes.

20. A method of multiple input, multiple output (MIMO) communication between a transmitting device and a receiving device, the method comprising:
 demultiplexing, at the transmitting device, a single high-speed data stream into a demultiplexed data signal;
 converting, at the transmitting device, the demultiplexed data signal into a plurality of modulated light signals that are substantially replicas of one another and are each representative of the demultiplexed data signal;
 providing the plurality of modulated light signals in a plurality of modes via a multimode medium from the transmitting device to the receiving device;
 converting, at the receiving device, the plurality of modulated light signals back into the demultiplexed data signal; and
 multiplexing, at the receiving device, the demultiplexed data signal back into the single high-speed data stream.

21. A multiple input, multiple output (MIMO) communication system for communications between a transmitting and a receiving device, comprising:
 means for demultiplexing, at the transmitting device, a single high-speed data stream into a demultiplexed data signal;
 means for convening, at the transmitting device, the demultiplexed data signal into modulated light signals that are substantially replicas of one another and are each representative of the demultiplexed data signal; and
 means for providing the modulated light signals in a plurality of modes via a multimode medium from the transmitting device to the receiving device.

22. The MIMO communication system of claim 21, further comprising:
 means for converting, at the receiving device, the modulated light signals back into the demultiplexed data signal; and
 means for multiplexing, at the receiving device, the demultiplexed data signal back into the single high-speed data stream.

23. A multiple input, multiple output (MIMO) communication system comprising:
 a demultiplexer that receives and demultiplexes a single high-speed data stream into a demultiplexed data signal;
 an array of emitters, coupled to the demultiplexer, that receives the demultiplexed data signal and outputs modulated light signals that are substantially replicas of one another and are each representative of the demultiplexed data signal;
 a multimode fiber, coupled to the array of emitters, that receives the modulated light signals from the array of emitters and carries the modulated light in a plurality of modes;
 an array of detectors, coupled to the multimode fiber, that receives the modulated light signals carried by the multimode fiber and outputs the demultiplexed data signal; and
 a multiplexer, coupled to the array of detectors that receives and multiplexes the demultiplexed data signal from the array of detectors back into the single high-speed data stream.

24. The MIMO communication system of claim 23, wherein at least one of the array of emitters and the array of detectors is arranged to minimize loss of light.

25. The MIMO communication system of claim 24, wherein at least one of the array of emitters and the array of detectors is arranged in a concave manner.

26. The MIMO communication system of claim 23, wherein at least one of the array of emitters and the array of detectors is arranged in a pattern that optimizes distribution of the plurality of modes.

27. A multiple input, multiple output (MIMO) communication system comprising:
 a demultiplexer that receives and demultiplexes a single high-speed data stream into a demultiplexed data signal;
 an array of emitters, coupled to the demultiplexer, that receives the demultiplexed data signal and outputs a plurality of signals that are substantially replicas of one another and are each representative of the demultiplexed data signal; and
 a multimode fiber, coupled to the array of emitters, that receives the plurality of signals from the array of emitters and carries the plurality of signals in a plurality of modes.

28. The MIMO communication system of claim 27, further comprising:
 an array of detectors, coupled to the multimode fiber, that receives the plurality of signals carried by the multimode fiber and outputs the demultiplexed data signal; and a multiplexer, coupled to the array of detectors that receives and multiplexes the demultiplexed data signal from the array of detectors back into the single high-speed data stream.

29. A method of multiple input, multiple output (MIMO) communication between a transmitting device and a receiving device, the method comprising:
  demultiplexing, at the transmitting device, a single high-speed data stream into a demultiplexed data signal;
  converting, at the transmitting device, the demultiplexed data signal into a plurality of signals that are substantially replicas of one another and are each representative of the demultiplexed data signal; and
  providing the plurality of signals in a plurality of modes via a multimode medium from the transmitting device to the receiving device.

30. The method of claim 29, further comprising:
  converting, at the receiving device, the plurality of signals back into the demultiplexed data signal; and
  multiplexing, at the receiving device, the demultiplexed data signal back into the single high-speed data stream.

31. A multiple input, multiple output (MIMO) communication system for communications between a transmitting and a receiving device, comprising:
  means for demultiplexing, at the transmitting device, a single high-speed data stream into a demultiplexed data signal;
  means for converting, at the transmitting device, the demultiplexed data signal into a plurality of signals that are substantially replicas of one another and are each representative of the demultiplexed data signal; and
  means for providing the plurality of signals in a plurality of modes via a multimode medium from the transmitting device to the receiving device.

32. The MIMO communication system of claim 31, further comprising:
  means for converting, at the receiving device, the plurality of signals back into the demultiplexed data signal; and
  means for multiplexing, at the receiving device, the demultiplexed data signal back into the single high-speed data stream.

33. The MIMO communication system of claim 7, wherein the multimode medium is separated from the array of emitters and the array of detectors.

34. The MIMO communication system of claim 1, wherein the array of detectors performs error correction utilizing the received plurality of signals based on the information that the received plurality of signals were output by the array of emitters as identical representations of the data signal, in order to reconstruct and output the data signal.

* * * * *